Figure 1:
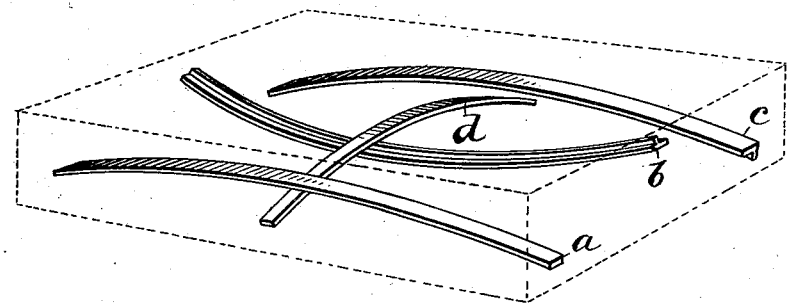
Figure 2:
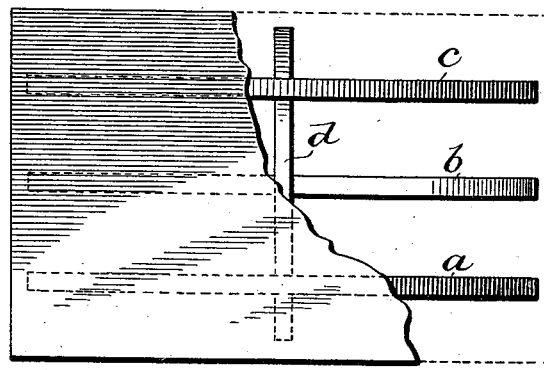
Figure 3:
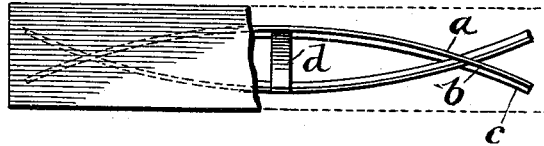

(No Model.)

H. BRUNSON.
PAVING BLOCK.

No. 508,537. Patented Nov. 14, 1893.

Witnesses
Jno G Hinkel
A. N. Dobson

Inventor
Horace Brunson
By Foster Freeman
Attorneys

UNITED STATES PATENT OFFICE.

JAMES CHASE, OF ROCHESTER, NEW YORK.

ELECTRIC-RAILWAY TROLLEY.

SPECIFICATION forming part of Letters Patent No. 508,538, dated November 14, 1893.

Application filed April 8, 1893. Serial No. 469,572. (No model.)

*To all whom it may concern:*

Be it known that I, JAMES CHASE, a citizen of the United States, residing at Rochester, in the county of Monroe and State of New York, have invented new and useful Improvements in Trolley Devices, of which the following is a specification.

My invention relates to trolley devices for electric railways and has for its object to provide an improved divided trolley-arm and self-oiling trolley wheel embodying certain peculiar features of construction and novel combinations of parts as hereinafter more particularly described and claimed.

The invention is illustrated in the annexed drawing which represents a transverse sectional elevation of a trolley-wheel having a rigidly attached shaft journaled in thimble bearings supported in oil chambers that are carried by the divided trolley-arm.

The trolley wheel 1, is provided on each side with a deep annular recess 2 and is rigidly mounted on a shaft 3, as shown. The shaft 3 is journaled in tapering thimble bearings 4 that are centrally supported in the inner and outer walls of two annular oil chambers 5 which are extended into the annular recesses 2 of the trolley wheel. In the outer end of each thimble bearing 4, at the end of the shaft 2, is a yielding thrust bearing 6 backed up by a spring 7 to support the end pressure of the shaft. The under side of each tapering thimble bearing 4 is provided with oil-holes 8 to permit the passage of oil to the shaft of the trolley wheel. These holes, and also the base of each oil chamber, are filled with a suitable absorbent material capable of conducting the oil to the shaft. By this arrangement of oil-holes beneath the shaft, in connection with absorbent material placed in the base of the oil chambers and extended into the said oil holes, every drop of oil is utilized in such a manner as to pass freely to the shaft while in motion, but without waste. Each oil chamber 5 is provided at the top with a screw tap 9 that may be easily and quickly removed when it is necessary to supply the chamber with oil. The oil chambers 5, together with the bearings for the trolley wheel shaft, are carried by a divided trolley arm 10 having some peculiarities of construction that combine the advantages of simplicity, strength and facility in mounting or removing the trolley wheel and the bearings for its shaft. The internally threaded socket 11 for receiving the end of the trolley pole, not shown, is formed wholly in the lower end of one side or section of the divided trolley arm 10 which is divided at 12 in a vertical line above said socket. A threaded bolt opening is formed in one section of the divided trolley arm and a plain perforation in the other section for insertion of a screw bolt 13 that is secured by a nut 14 at one end. One section of the divided arm 10 has a lug 15 that sets into a corresponding recess in the other section to obviate any liability to movement of the parts when drawn together and secured by the bolt and nut. By this construction great strength and stability are imparted to the divided trolley arm and yet its parts can be readily and quickly disconnected to permit insertion or removal of the trolley-wheel. The tapering thimble bearings 4 are fitted or driven into their seats in the inner and outer walls of the oil chambers 5 from the inner side of each chamber before the parts of the divided trolley arm are brought together, thus obviating any necessity for the use of set screws to fasten the bearings in place. When these bearings are worn they can be easily knocked out and replaced by new ones, and therefore the trolley arm and attached oil-chambers may be used indefinitely. The shells of the oil chambers 5 are preferably cast in two parts, as shown, each part being shouldered or flanged at 16, to be engaged with and soldered securely to the other part. The inner half of each shell is preferably the male portion, thereby obviating any weakening of the solder joint from driving the thimble bearings 4 into their seats or from thrust of the trolley shaft when in motion. Although I have shown the shells of the oil-chamber as cast in separate parts it is obvious that each chamber may be cast whole, if desired. Each oil-chamber, or the outer part thereof as shown, may be cast with one of the sections of the divided trolley arm or should be otherwise rigidly secured thereto. The extension of the inner side of each oil-chamber 5 into the adjacent recessed side of the trolley wheel greatly increases the capacity of the oil chamber and at the same time leaves no cement or similar material having embedded therein longitudinal curved bars arranged out of contact with each other and with their curves extending in alternate directions, and a transversely curved bar, substantially as described.

3. A paving block comprising a mass of cement or similar material, having embedded therein longitudinal bars of metal arranged out of contact with each other and with their curves extending in alternate directions and a transverse curved bar interlocking with the longitudinal bar, substantially as described.

In testimony whereof I have signed my name to this specification in the presence of two subscribing witnesses.

HORACE BRUNSON.

Witnesses:
HORATIO G. KIMBALL,
WILLIAM P. KIMBALL.